US012777568B2

(12) United States Patent
Borra et al.

(10) Patent No.: US 12,777,568 B2
(45) Date of Patent: Oct. 27, 2026

(54) DETERMINING A DEGREE OF SMOOTHING BASED ON WHETHER A LATENCY BETWEEN LIGHT AND AUDIO WILL LIKELY EXCEED A THRESHOLD

(71) Applicant: SIGNIFY HOLDING B.V., Eindhoven (NL)

(72) Inventors: Tobias Borra, Rijswijk (NL); Gerardus Wilhelmus Theodorus Van Der Heijden, Haaren (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 359 days.

(21) Appl. No.: 18/698,062

(22) PCT Filed: Oct. 4, 2022

(86) PCT No.: PCT/EP2022/077492
§ 371 (c)(1),
(2) Date: Apr. 3, 2024

(87) PCT Pub. No.: WO2023/057402
PCT Pub. Date: Apr. 13, 2023

(65) Prior Publication Data
US 2025/0240864 A1 Jul. 24, 2025

(30) Foreign Application Priority Data
Oct. 7, 2021 (EP) .................................... 21201433

(51) Int. Cl.
*H05B 47/175* (2020.01)

(52) U.S. Cl.
CPC ................................. *H05B 47/197* (2024.01)

(58) Field of Classification Search
CPC ......... H05B 47/197; Y02B 20/40; A63J 17/00
(Continued)

(56) References Cited

U.S. PATENT DOCUMENTS 9,185,780 B2 * 11/2015 Pijlman .................. G08B 21/06
11,627,425 B2 * 4/2023 Fuhrmann ............. H04R 1/326
381/56
(Continued)

FOREIGN PATENT DOCUMENTS

WO 2007072339 A2 6/2007
WO 2018066097 A1 4/2018
(Continued)

*Primary Examiner* — Xu Mei

(57) ABSTRACT

A system is configured to determine, based on received input, whether a latency (58,78) between one or more light sources rendering light effects (61-67), determined based on characteristics of audio content, and an audio rendering device rendering a corresponding portion of the audio content will likely exceed a threshold and determine a degree of smoothing (59,79) based on whether the latency will likely exceed the threshold. The degree of smoothing is higher if the latency will likely exceed the threshold than if the latency will likely not exceed the threshold. The system is further configured to determine the light effects based on the characteristics of the audio content while applying smoothing according to the determined degree of smoothing and control the one or more light sources to render the light effects while the audio content is being rendered on the audio rendering device.

14 Claims, 6 Drawing Sheets

(58) Field of Classification Search
USPC ............................... 381/61; 362/86; 315/149
See application file for complete search history.

(56) References Cited

U.S. PATENT DOCUMENTS

| | | | | |
|---|---|---|---|---|
| 12,520,405 | B2 * | 1/2026 | Borra | H04R 1/26 |
| 2010/0265414 | A1 * | 10/2010 | Nieuwlands | H04N 9/73<br>348/739 |
| 2016/0302286 | A1 * | 10/2016 | Kim | G06F 3/16 |
| 2024/0407065 | A1 * | 12/2024 | Jagmag | H05B 47/105 |

FOREIGN PATENT DOCUMENTS

| | | | |
|---|---|---|---|
| WO | 2019234028 | A1 | 12/2019 |
| WO | 2020035310 | A1 | 2/2020 |
| WO | 2020089150 | A1 | 5/2020 |
| WO | 2021160552 | A1 | 8/2021 |

* cited by examiner

DETERMINING A DEGREE OF SMOOTHING BASED ON WHETHER A LATENCY BETWEEN LIGHT AND AUDIO WILL LIKELY EXCEED A THRESHOLD

CROSS-REFERENCE TO PRIOR APPLICATIONS

This application is the U.S. National Phase application under 35 U.S.C. § 371 of International Application No. PCT/EP2022/077492, filed on Oct. 4, 2022, which claims the benefit of European Patent Application No. 21201433.6, filed on Oct. 7, 2021. These applications are hereby incorporated by reference herein.

FIELD OF THE INVENTION

The invention relates to a system for controlling one or more light sources to render light effects determined based on characteristics of audio content while said audio content is being rendered on an audio rendering device.

The invention further relates to a method of controlling one or more light sources to render light effects determined based on characteristics of audio content while said audio content is being rendered on an audio rendering device.

The invention also relates to a computer program product enabling a computer system to perform such a method.

BACKGROUND OF THE INVENTION

A dynamic lighting system can dramatically influence the experience and impression of audio-visual material, e.g., when the colors sent to the lights match what would be seen in the composed environment around the screen. However, a dynamic lighting system cannot only be used to enhance screen content, but also to enhance the experience of listening to music, e.g., by using a software algorithm to analyze an audio stream in real-time and create light effects based on certain audio characteristics such as intensity and frequency bands.

An alternative approach is to preprocess music and extract relevant meta data and translate this to a light script specifying light effects. Some of the streaming services offer such metadata. For example, Spotify has a meta data for each song, that includes different audio properties and can be accessed via the Spotify API. The advantage of using metadata for light effects creation is that it does not require access to the audio stream and allows analysis of the data of the complete song instead of relying on the real-time data.

When light effects are used to enhance audio on connected luminaires, it is important that the light effects are in sync with the audio. Especially when e.g., Bluetooth speakers are used, latencies larger than 100 ms may be introduced. Unfortunately, a difference of 100 ms can be enough to be noticeable and may negatively impact the experience. For example, light effects may be intended to be rendered at the same time as auditory effects in an audio segment and depending on the overall latency of the audio segment, it becomes ambiguous whether an auditory effect 'belongs' to a first or a second light effect.

WO 2018/066097 A1 discloses a lighting control device for controlling a lighting device depending on music playback, with a lighting device information storage unit which stores lighting device information, including light emission response time of the lighting device, a lighting device selection unit which selects a lighting device to be controlled, and a light emission timing adjustment unit which uses the light emission response time of the lighting device selected by the lighting device selection unit to adjust light emission timing of the selected lighting device.

Ideally, the system would sync light and audio to provide an optimal user experience. However, this is not always possible. WO 2019/234028 A1 describes a solution in case this is not possible. WO 2019/234028 A1 describes a device and method that improve the light experience when a variation in delay of the audio segment would affect the light experience. The device and method achieve this by selecting light effects based on information indicating or affecting a variation in delay. This makes it possible to skip light effects that are sensitive to variations in delay. However, skipping light effects may also degrade the user experience somewhat.

SUMMARY OF THE INVENTION

It is a first object of the invention to provide a system, which can be used to reduce the impact of a delay between light and audio rendering with no or minimal skipping of light effects.

It is a second object of the invention to provide a method, which can be used to reduce the impact of a delay between light and audio rendering with no or minimal skipping of light effects.

In a first aspect of the invention, a system for controlling one or more light sources to render light effects determined based on characteristics of audio content while said audio content is being rendered on an audio rendering device comprises at least one input interface, at least one output interface, and at least one processor configured to determine, based on input received via said at least one input interface, whether a latency between said one or more light sources rendering said light effects and said audio rendering device rendering a corresponding portion of said audio content will likely exceed a threshold, determine a degree of smoothing based on whether said latency will likely exceed said threshold, said degree of smoothing being higher if said latency will likely exceed said threshold than if said latency will likely not exceed said threshold, determine said light effects based on said characteristics of said audio content while applying smoothing according to said determined degree of smoothing, and control, via said at least one output interface, said one or more light sources to render said light effects.

By increasing the degree of smoothing if the latency between the light and audio rendering will likely (i.e., is expected/estimated to) exceed a certain threshold, this latency, i.e., the light effects being out of sync, may be 'masked' with no or minimal skipping of light effects. Increased smoothing will result in a more 'smeared-out' effect on the light source(s), where the precise on- and offset of a light event is not as clearly distinguishable anymore. Thus, increased smoothing will serve to 'mask' the effects of latency.

The latency between the light and audio rendering may be determined to likely exceed a certain threshold when there is a certain amount of uncertainty in the latency. This could be when the amount of latency cannot be determined automatically or a user does not give an indication of the latency (e.g., a user does not want to fiddle with a latency slider and just wants the system to solve it), for example. Said at least one processor may be configured to determine whether said latency will likely exceed said threshold based on a type of said audio rendering device and/or a user specified latency and/or characteristics of an audio system, for example. Said audio system comprises said audio rendering device.

Said at least one processor may be configured determine an estimate of said latency. The estimate may be determined based on the above-mentioned type of the audio rendering device and/or user specified latency and/or characteristics of the audio system, for example. Alternatively, the at least one processor may be configured to determine whether the latency will likely exceed the threshold without first determining an estimate of the latency, e.g., directly based on system characteristics. As an example of the former, streaming over Bluetooth may be associated with an estimated latency of 200 milliseconds. As an example of the latter, streaming over Bluetooth may be associated with the latency likely exceeding the threshold.

Said at least one processor may be configured to determine said degree of smoothing according to a smoothing function which uses said estimate of said latency as input. This allows more smoothing to be applied if the threshold is exceeded by a larger amount (preferably, up to a maximum).

Said at least one processor may be configured to apply said smoothing according to said determined degree of smoothing by determining a fade-in duration and/or a fade-out duration for said light effects based on said determined degree of smoothing. This is a beneficial way of realizing smoothing.

Said at least one processor may be configured to determine said fade-in duration of a light effect further based on a distance between a color and/or intensity of said light effect and a color and/or intensity of the preceding light effect and/or determine said fade-out duration of a light effect based on a distance between said color and/or intensity of said light effect and a color and/or intensity of the succeeding light effect. For example, when the light is already on (e.g., 50% light intensity) and a light effect needs to be rendered for an event at 100% light intensity, it would be beneficial to use a different smoothing profile than when the light is off and a light effect needs to be rendered for an event at 100% light intensity. In the former case, less smoothing would be beneficial. In the latter case, more smoothing would be beneficial.

Said at least one processor may be configured to determine, for a period of a plurality of consecutive periods of said audio content, a quantity of light effects to be rendered during said period, said consecutive periods having a predefined duration, and determine said degree of smoothing for said light effects to be rendered during said period based on whether said latency will likely exceed said threshold and further based on said quantity of light effects determined for said period. When the amount of events exceeds the given threshold, it normally does not make sense to increase smoothing, since in this case the audiovisual mismatch will not be apparent. Examples of such a threshold are 2 or 3 events per second.

Said at least one processor may be configured to determine said light effects to be rendered during said period in dependence on a user-selected dynamicity level. A higher user-selected dynamicity level typically results in more light effects being rendered. A user may be able to select a dynamicity preset of subtle, medium, high, or intense, for example. When the dynamic preset is intense, smoothing has less benefit. In this case, the number of events is relatively high and the above-mentioned threshold will be exceeded relatively quickly.

Said at least one processor may be configured to determine said degree of smoothing further based on whether said latency will likely not exceed a maximum, said degree of smoothing being higher if said latency will likely exceed said threshold and will likely not exceed said maximum than if said latency will likely exceed said maximum. If the latency is too high, then it is normally not possible to counteract the effects of the latency by using additional smoothing. The maximum may be 500 milliseconds, for example.

Said at least one processor may be configured to determine for at least one of said light effects whether said at least one light effect relates to a key event in said audio content and increase an intensity of said at least one light effect. This ensures that although smoothing is increased, the key event will still 'pop' with respect to the rest of the audio content.

Said one or more light sources may comprise a plurality of light sources and said at least one processor may be configured to control said plurality of light sources to alternately render said light effects such that said light effects are distributed over said plurality of light sources. Thus, light events may be distributed over the light sources as well as being smoothed. For example, for a part of a song containing four events per second, the light events may be 'split' and rendered alternating between two connected lamps. Not only does this mask potential out-of-sync issues, but it also provides more room for smoothing.

Said at least one processor may be configured to determine that said latency will likely exceed said threshold when a user specifies a latency larger than a further threshold. If the user has specified a latency which exceeds a realistic threshold (e.g., 10 seconds), the specified latency may be considered inaccurate, but it may further be considered that the user is negatively impacted by latency and additional smoothing is therefore needed.

Said at least one processor may be configured to determine whether a user-specified latency value exceeds said threshold and determine said degree of smoothing further based on whether said user-specified latency value is larger than a further threshold. For example, when the user-specified latency value is larger than the further threshold, a degree of smoothing may be determined that is larger than just proportional to the user-specified latency value. The rationale behind this is that large latencies are difficult to detect, so when the user has to manually indicate the latency, there is a bigger chance of user error.

In a second aspect of the invention, a method of controlling one or more light sources to render light effects determined based on characteristics of audio content while said audio content is being rendered on an audio rendering device comprises determining, based on received input, whether a latency between said one or more light sources rendering said light effects and said audio rendering device rendering a corresponding portion of said audio content will likely exceed a threshold, determining a degree of smoothing based on whether said latency will likely exceed said threshold, said degree of smoothing being higher if said latency will likely exceed said threshold than if said latency will likely not exceed said threshold, determining said light effects based on said characteristics of said audio content while applying smoothing according to said determined degree of smoothing, and controlling said one or more light sources to render said light effects. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for controlling one or more light sources to render light effects determined based on characteristics of audio content while said audio content is being rendered on an audio rendering device.

The executable operations comprise determining, based on received input, whether a latency between said one or more light sources rendering said light effects and said audio rendering device rendering a corresponding portion of said audio content will likely exceed a threshold, determining a degree of smoothing based on whether said latency will likely exceed said threshold, said degree of smoothing being higher if said latency will likely exceed said threshold than if said latency will likely not exceed said threshold, determining said light effects based on said characteristics of said audio content while applying smoothing according to said determined degree of smoothing, and controlling said one or more light sources to render said light effects.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
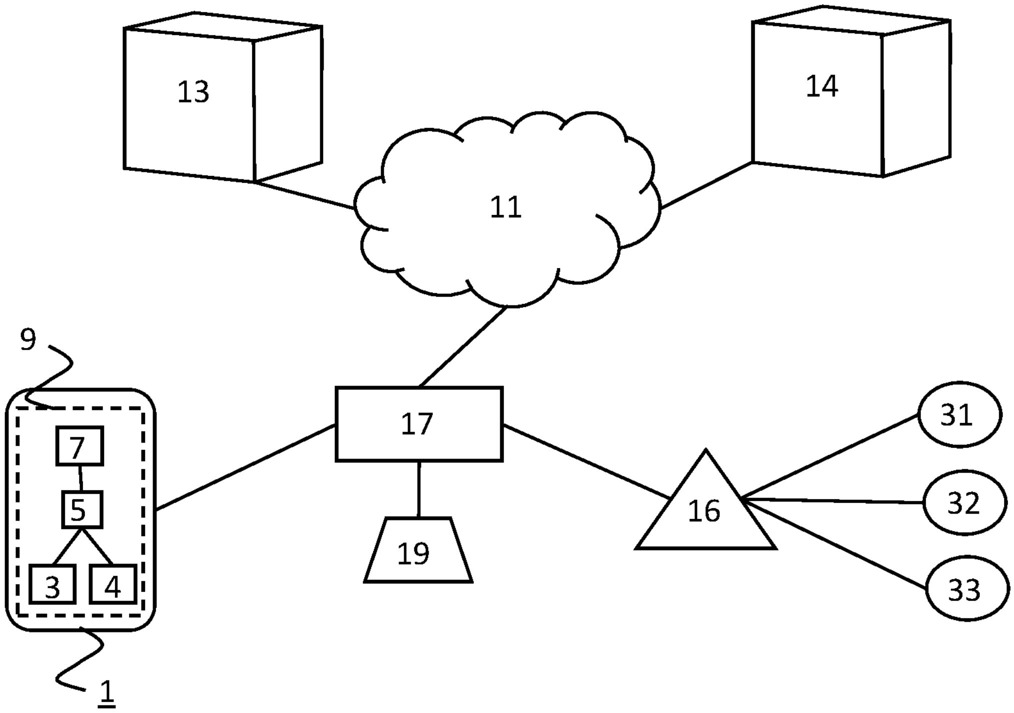
FIG. 1 is a block diagram of a first embodiment of the system.

FIG. 1 shows a first embodiment of the system for controlling one or more light sources to render light effects determined based on characteristics of audio content while the audio content is being rendered on an audio rendering device. In this first embodiment, the system is a mobile device 1. Mobile device 1 is able to control lighting devices 31-33 via a wireless LAN access point 17 and a bridge 16, and optionally via an Internet server 13, e.g., of the manufacturer of the lighting devices 31-33. The lighting devices 31-33 may be Philips Hue lamps, for example. The lighting devices 31-33 may each comprise one or more LED elements, for example. The lighting devices 31-33 communicate with the bridge 16, e.g., using Zigbee technology. The bridge 16 may be a Philips Hue bridge, for example. The bridge 16 is connected to the wireless LAN access point 17, e.g., via Wi-Fi or Ethernet.

Mobile device 1 is able to control playback of audio content, e.g., songs, via an Internet server 14, e.g., of a music streaming service such as Spotify. Mobile device 1 is able to start and stop playback of audio content available in the music library of the music streaming service. In the example of FIG. 1, music is streamed to an audio rendering device 19, e.g., a smart and/or Wi-Fi speaker system or an A/V receiver. The audio rendering device 19 is connected to the wireless LAN access point 17 and may stream music directly from the Internet server 14 via Wi-Fi. Alternatively, music may be streamed from a music app running on the mobile device 1 to the audio rendering device 19 via Bluetooth. The wireless LAN access point 17 is connected to the Internet 11. The Internet servers 13 and 14 are also connected to the Internet 11. Instead of single Internet servers, clusters of Internet servers may be used. These clusters may be part of one or more clouds.

The mobile device 1 comprises a transceiver 3, a transmitter 4, a processor 5, memory 7, and a touchscreen display 9. The processor 5 is configured to determine, based on input received e.g., via the receiver 3 or the touchscreen display 9, whether a latency between the lighting devices 31-33 rendering the light effects and the audio rendering device 19 rendering a corresponding portion of the audio content will likely exceed a threshold. This determination may be made based on system characteristics (type of connected speakers etc.) or user input (e.g., with a slider indicating the approximate latency), for example.

In the example of FIG. 1, if music is streamed via Bluetooth, it is difficult to determine the amount of latency and compensate for latency. In this case, the latency may be considered to likely exceed the threshold. If music is streamed directly from the Internet server 14 via Wi-Fi, the latency is normally, for most users, below 100 ms and may be considered to likely not exceed the threshold.

The processor 5 is further configured to determine a degree of smoothing based on whether the latency will likely exceed the threshold. The degree of smoothing is higher if the latency will likely exceed the threshold than if the latency will likely not exceed the threshold. The processor 5 is further configured to determine the light effects based on the characteristics of the audio content while applying smoothing according to the determined degree of smoothing, and control, via the transmitter 4, the lighting devices 31-33 to render the light effects.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g., from ARM or Qualcomm or an application-specific processor. The processor 5 of the mobile device 1 may run an Android or iOS operating system for example. The display 9 may comprise an LCD or OLED display panel, for example. The processor 5 may use touch screen display 9 to provide a user interface, for example. The memory 7 may comprise one or more memory units. The memory 7 may comprise solid state memory, for example.

The receiver 3 and the transmitter 4 may use one or more wireless communication technologies, e.g., Wi-Fi (IEEE 802.11) for communicating with the wireless LAN access point 17, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The mobile device 1 may comprise other components typical for a mobile device such as a battery and a power connector. The invention may be implemented using a computer program running on one or more processors.

In the embodiment of FIG. 1, the lighting devices 31-33 are controlled by the mobile device 1 via the bridge 16. In an alternative embodiment, one or more of the lighting devices 31-33 are controlled by the mobile device 1 without a bridge, e.g. directly via Bluetooth or via the wireless LAN access point 17. Optionally, the lighting devices 31-33 are controlled via the cloud, e.g., via Internet server 13. The lighting devices 31-33 may be capable of receiving and transmitting Wi-Fi signals, for example.

Figure 2:
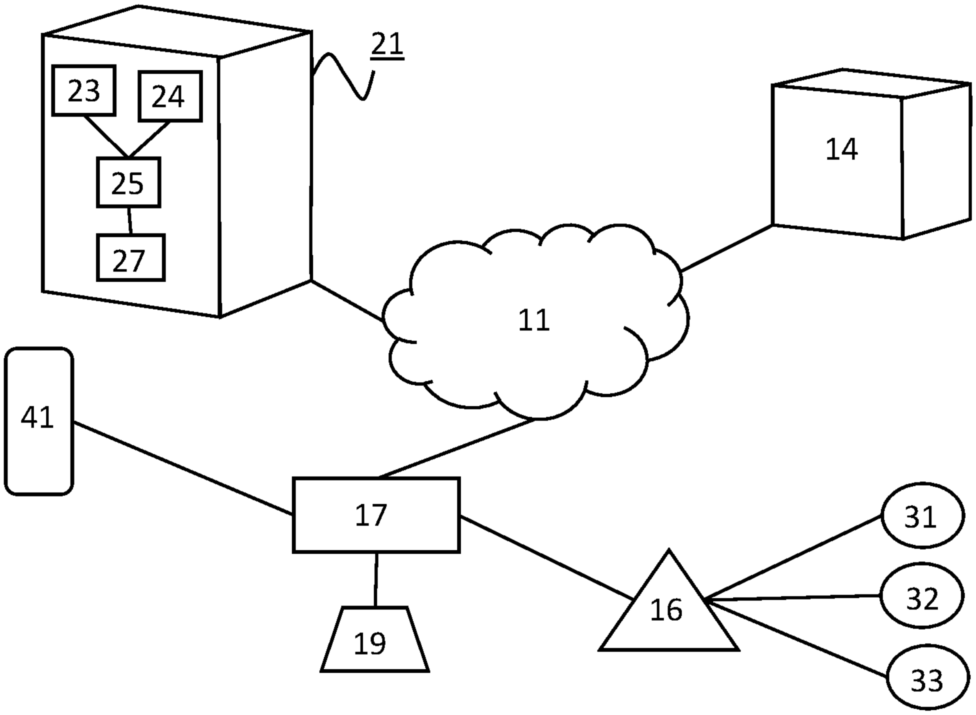
FIG. 2 is a block diagram of a second embodiment of the system.

FIG. 2 shows a second embodiment of the system for controlling one or more light sources to render light effects determined based on characteristics of audio content while the audio content is being rendered on an audio rendering device. In this second embodiment, the system is a computer 21. The computer 21 is connected to the Internet 11 and acts as a server. The computer 21 may be operated by a lighting company, for example. In the embodiment of FIG. 2, the computer 21 is able to control the lighting devices 31-33 via the wireless LAN access point 17 and the bridge 16 and able to communicate with the Internet server 14 of a music streaming service.

The computer 21 comprises a receiver 23, a transmitter 24, a processor 25, and storage means 27. The processor 25 is configured to determine, based on input received via the receiver 23, whether a latency between the lighting devices 31-33 rendering the light effects and the audio rendering device 19 rendering a corresponding portion of the audio content will likely exceed a threshold. This determination may be made based on system characteristics (type of connected speakers etc.) or user input (e.g., with a slider indicating the approximate latency), for example.

The processor 25 is further configured to determine a degree of smoothing based on whether the latency will likely exceed the threshold. The degree of smoothing is higher if the latency will likely exceed the threshold than if the latency will likely not exceed the threshold. The processor 25 is further configured to determine the light effects based on the characteristics of the audio content while applying smoothing according to the determined degree of smoothing, and control, via the transmitter 24, the lighting devices 31-33 to render the light effects.

In the embodiment of the computer 21 shown in FIG. 2, the computer 21 comprises one processor 25. In an alternative embodiment, the computer 21 comprises multiple processors. The processor 25 of the computer 21 may be a general-purpose processor, e.g., from Intel or AMD, or an application-specific processor. The processor 25 of the computer 21 may run a Windows or Unix-based operating system for example. The storage means 27 may comprise one or more memory units. The storage means 27 may comprise one or more hard disks and/or solid-state memory, for example. The storage means 27 may be used to store an operating system, applications and application data, for example.

The receiver 23 and the transmitter 24 may use one or more wired and/or wireless communication technologies such as Ethernet and/or Wi-Fi (IEEE 802.11) to communicate with the wireless LAN access point 17, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 23 and the transmitter 24 are combined into a transceiver. The computer 21 may comprise other components typical for a computer such as a power connector. The invention may be implemented using a computer program running on one or more processors.

In the embodiment of FIG. 2, the computer 21 receives data from and transmits data to the lighting devices 31-33 via the bridge 16. In an alternative embodiment, the computer 21 receives data from and transmits data to one or more of the lighting devices 31-33 without a bridge.

In the embodiments of FIGS. 1 and 2, the system of the invention comprises a mobile device or a computer (e.g., cloud computer). In an alternative embodiment, the system of the invention is a different device, e.g., a bridge. In the embodiments of FIGS. 1 and 2, the system of the invention comprises a single device. In an alternative embodiment, the system of the invention comprises a plurality of devices.

Figure 3:
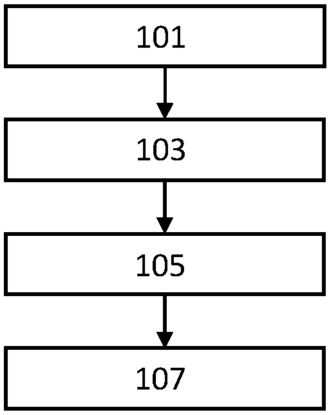
FIG. 3 is a flow diagram of a first embodiment of the method.

A first embodiment of the method of controlling one or more light sources to render light effects determined based on characteristics of audio content while the audio content is being rendered on an audio rendering device is shown in FIG. 3. The method may be performed by the mobile device 1 of FIG. 1 or the computer 21 of FIG. 2, for example.

A step 101 comprises determining, based on received input, whether a latency between the one or more light sources rendering the light effects and the audio rendering device rendering a corresponding portion of the audio content will likely exceed a threshold. This determination may be made based on system characteristics (type of connected speakers etc.) or user input (e.g., with a slider indicating the approximate latency), for example. The latency may be estimated, but alternatively, this determination is made without first estimating the latency, e.g., based directly on system characteristics.

A step 103 comprises determining a degree of smoothing based on whether the latency will likely exceed the threshold. The degree of smoothing is higher if the latency will likely exceed the threshold than if the latency will likely not exceed the threshold. A step 105 comprises determining the light effects based on the characteristics of the audio content while applying smoothing according to the determined degree of smoothing. The (additional) smoothing is applied to counteract the effects of the latency. A light effect may be determined for each event in the audio content, for example. Events may be data points which have an audio intensity higher than a threshold, for example. These data points may be included in metadata provided by the music streaming service, e.g., Spotify. A step 107 comprises controlling the one or more light sources to render the light effects.

Figure 4:
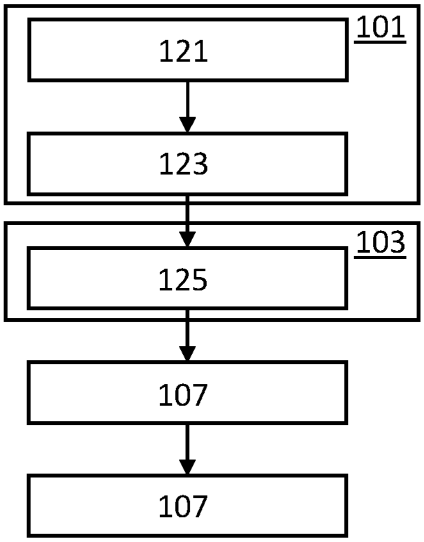
FIG. 4 is a flow diagram of a second embodiment of the method.

A second embodiment of the method of controlling one or more light sources to render light effects determined based on characteristics of audio content while the audio content is being rendered on an audio rendering device is shown in FIG. 4. The second embodiment of FIG. 4 is an extension of the first embodiment of FIG. 3. In the embodiment of FIG. 4, step 101 of FIG. 3 is implemented by steps 121 and 123 and step 103 of FIG. 3 is implemented by a step 125.

Step 121 comprises determining an estimate of the latency. Step 123 comprises determining whether the estimate of the latency determined in step 121 exceeds the threshold. If so, then it is considered that the actual latency will likely exceed the threshold. Step 125 comprises determining a degree of smoothing based on whether the latency will likely exceed the threshold. If the estimated latency exceeds the threshold, the degree of smoothing is determined according to a smoothing function which uses the estimate of the latency, determined in step 121, as input.

Figure 5:
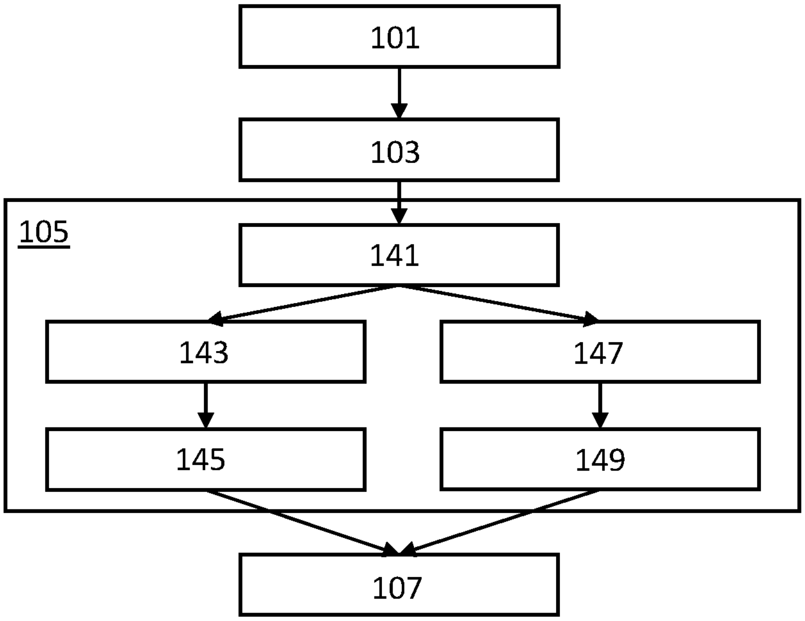
FIG. 5 is a flow diagram of a third embodiment of the method.

A third embodiment of the method of controlling one or more light sources to render light effects determined based on characteristics of audio content while the audio content is being rendered on an audio rendering device is shown in FIG. 5. The third embodiment of FIG. 5 is an extension of the first embodiment of FIG. 3. In the embodiment of FIG. 5, step 105 of FIG. 3 is implemented by steps 141,143,145, 147, and 149. The different parameters of the light effects are determined in steps 141, 145, and 147.

Step 141 comprises determining the color and intensity of a plurality of light effects based on one or more characteristics of the audio content. Step 143 comprises determining, for each light effect, a distance between a color and/or intensity of the light effect and a color and/or intensity of the preceding light effect, based on the results of step 141. Step 145 comprises determining a fade-in duration for the light effects based on the determined degree of smoothing, as determined in step 103, and based on the distance determined in step 143.

Step 147 comprises determining, for each light effect, a distance between the color and/or intensity of the light effect and a color and/or intensity of the succeeding light effect, based on the results of step 141. Step 149 comprises determining a fade-out duration for the light effects based on the determined degree of smoothing, as determined in step 103, and based on the distance determined in step 147.

For example, when the light is already on (e.g., 50% light intensity) and a light effect needs to be rendered for an event at 100% light intensity, it would be beneficial to use a different smoothing profile than when the light is off and a light effects needs to be rendered for an event at 100% light intensity. In the former case, less smoothing would be beneficial. In the latter case, more smoothing would be beneficial. In an alternative embodiment, steps 143 and 147 have been omitted and the fade-in and fade-out durations are not determined based on these distances in steps 145 and 149.

The degree of smoothing is preferably determined such that with higher latencies, the smoothing is gradual enough to make the light intensity peak of the light effect not stand out, in order to mask the latency. A maximum fade-in duration, e.g., 5 seconds, and/or a maximum fade-out duration, e.g., 5 seconds, may be defined.

Figure 6:
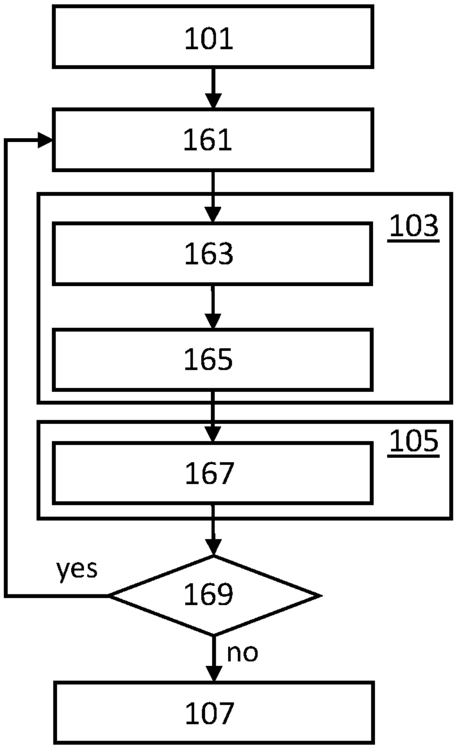
FIG. 6 is a flow diagram of a fourth embodiment of the method.

A fourth embodiment of the method of controlling one or more light sources to render light effects determined based on characteristics of audio content while the audio content is being rendered on an audio rendering device is shown in FIG. 6. The method may be performed by the mobile device 1 of FIG. 1 or the computer 21 of FIG. 2, for example.

Step 101 comprises determining, based on received input, whether a latency between the one or more light sources rendering the light effects and the audio rendering device rendering a corresponding portion of the audio content will likely exceed a threshold. In the embodiment of FIG. 6, the audio content is divided into consecutive periods having a predefined duration. For example, the audio content may be divided in chunks of 5 seconds or 10 seconds. In the first iteration of a step 161, the first period of the audio content is selected.

A step 163 comprises determining a quantity of light effects to be rendered during the period selected in step 161. A step 165 comprises determining a degree of smoothing for the light effects to be rendered during the period selected in step 161 based on whether the latency will likely exceed the threshold and further based on the quantity of light effects determined in step 163 for this period.

Preferably, step 165 comprises checking whether a particular threshold in number of events is crossed or not and applying additional smoothing only when the amount of events is smaller than a given threshold. When the amount of events exceeds the given threshold, it normally does not make sense to increase smoothing, since in this case the audiovisual mismatch will not be apparent. Examples of such a threshold are 2 or 3 events per second.

Step 167 comprises determining the light effects based on the characteristics of the audio content while applying smoothing according to the degree of smoothing, as determined in step 165. In the embodiment of FIG. 6, the light effects are determined in step 165 in dependence on a user-selected dynamicity level. A user may be able to select a dynamicity preset of subtle, medium, high, or intense, for example. In the embodiment of FIG. 6, the number of events for which a light effect is rendered depends on the characteristics of the audio content (e.g., as specified in metadata) and the user-selected dynamicity level. A higher user-selected dynamicity level results in more light effects being rendered. When the dynamic preset is intense, smoothing has less benefit. In this case, the number of events is relatively high and the above-mentioned threshold will be exceeded relatively quickly. In an alternative embodiment, the light effects are not determined in dependence on a user-selected dynamicity level.

A step 169 comprises determining whether a period exists in the audio content that is consecutive to the period last selected in step 161. If so, then this period is selected in the next iteration of step 161, after which the method proceeds as shown in FIG. 6. If not, then step 107 is performed next. Step 107 comprises controlling the one or more light sources to render the light effects determined in the multiple iterations of step 167.

Figure 7:
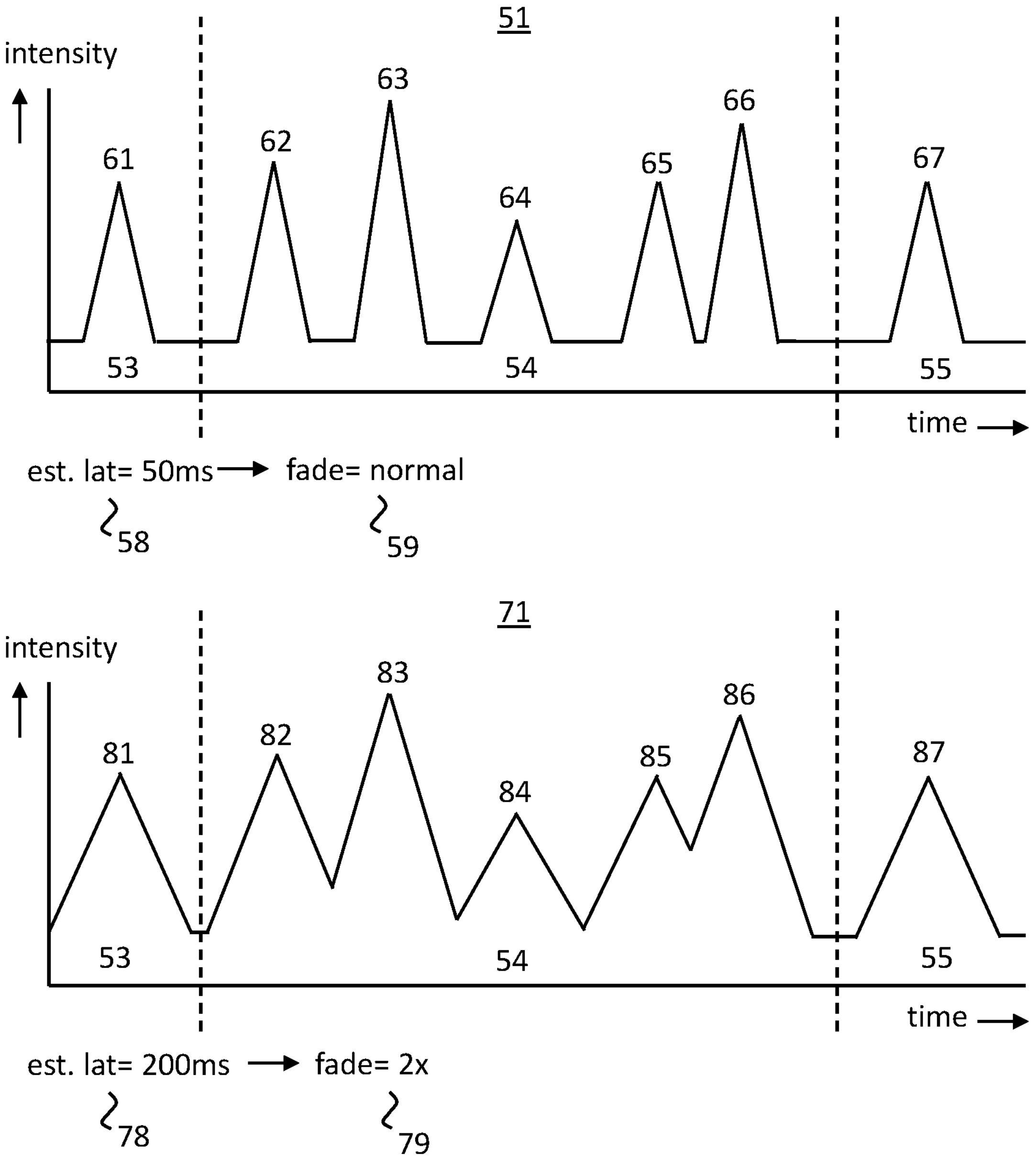
FIG. 7 shows examples of different degrees of smoothing.

FIG. 7 shows examples of different degrees of smoothing. Graphs 51 and 71 represent light intensity over time. The light effects 61-67 shown in graphs 51 and 71 are determined based on the same audio characteristics and for the same events. In the examples of FIG. 7, the light is never completely turned off, but alternatively, the light may be completely turned off at certain moments between light effects.

Graph 51 represents a situation when the estimated latency is 50 milliseconds, as indicated by indicator 58, and the degree of smoothing, in this case fading, is determined to be normal, as indicated by indicator 59. Graph 71 represents a situation when the estimated latency is 200 milliseconds, as indicated by indicator 78, and the fading is determined to be twice as long as the default fading, as indicated by indication 79. The fade-in duration(s) and the fade-out duration(s) may be determined with the method of FIG. 5, for example.

FIG. 7 shows that when the fade-in duration(s) and the fade-out duration(s) are increased, the light effects 61-67 transition/blend more smoothly and the peaks stand out less. This is done to mask the latency. With an even higher estimated latency, the effect may be more pronounced, although the benefit may only be present up to a certain maximum latency. In FIG. 7, three periods 53-55 are distinguished. The periods may have a length of 5 seconds or 10 seconds, for example. The fade-in durations and the fade-out durations may depend on the number of events per period, as described in relation to the method of FIG. 6.

Figure 8:
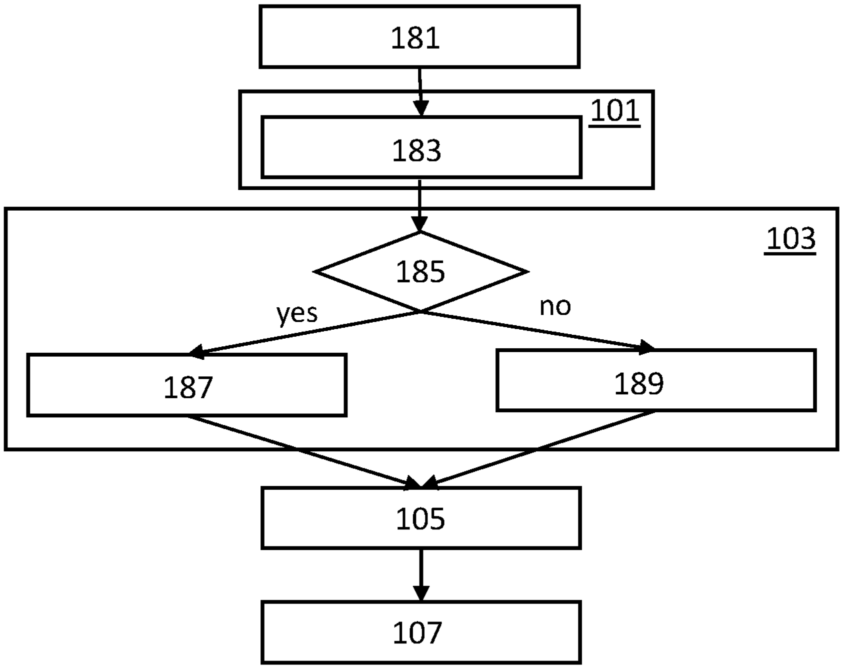
FIG. 8 is a flow diagram of a fifth embodiment of the method.

A fifth embodiment of the method of controlling one or more light sources to render light effects determined based on characteristics of audio content while the audio content is being rendered on an audio rendering device is shown in FIG. 8. The fifth embodiment of FIG. 8 is an extension of the first embodiment of FIG. 3. In the embodiment of FIG. 8, step 101 of FIG. 3 is preceded by a step 181 and implemented by a step 183 and step 103 of FIG. 3 is implemented by steps 185, 187, and 189.

Step 181 comprises determining a type of the audio rendering device on which the audio content is rendered and/or a user specified latency and/or characteristics of an audio system that comprises the audio rendering device. Step 183 comprises determining whether the latency will likely exceed the threshold based on the type of the audio rendering device and/or the user specified latency and/or the characteristics of the audio system, as determined in step 181.

Step 185 comprises determining whether a user-specified latency value exceeds the threshold, e.g., 100 milliseconds. If so, step 187 is performed. If not step, 189 is performed. If the user has specified a latency which exceeds a realistic threshold (e.g., 10 seconds), the specified latency may be considered inaccurate, but it may further be considered that the user is negatively impacted by latency and additional smoothing is therefore needed.

Steps 187 and 189 comprise determining a degree of smoothing based on whether the latency will likely exceed the threshold, as determined in step 183. Step 187 comprises determining the degree of smoothing further based on whether the user-specified latency value is larger than a further threshold (e.g., 250 milliseconds). In step 187, it is determined that an increased smoothing should be used if a (realistic) latency larger than the further threshold has been specified by the user. The rationale behind this is that large latencies are difficult to detect, so when the user has to manually indicate the latency, there is a bigger chance of user error.

In steps 187 and 189, the degree of smoothing is higher if the latency will likely exceed the threshold than if the latency will likely not exceed the threshold. Moreover, in the embodiment of FIG. 8, in steps 187 and 189, the degree of smoothing is further determined based on whether the latency will likely not exceed a maximum, e.g., 500 milliseconds. The degree of smoothing is higher if the latency will likely exceed the threshold and will likely not exceed the maximum than if the latency will likely exceed the maximum. If the latency is too high, then it is normally not possible to counteract the effects of the latency by using additional smoothing.

Figure 9:
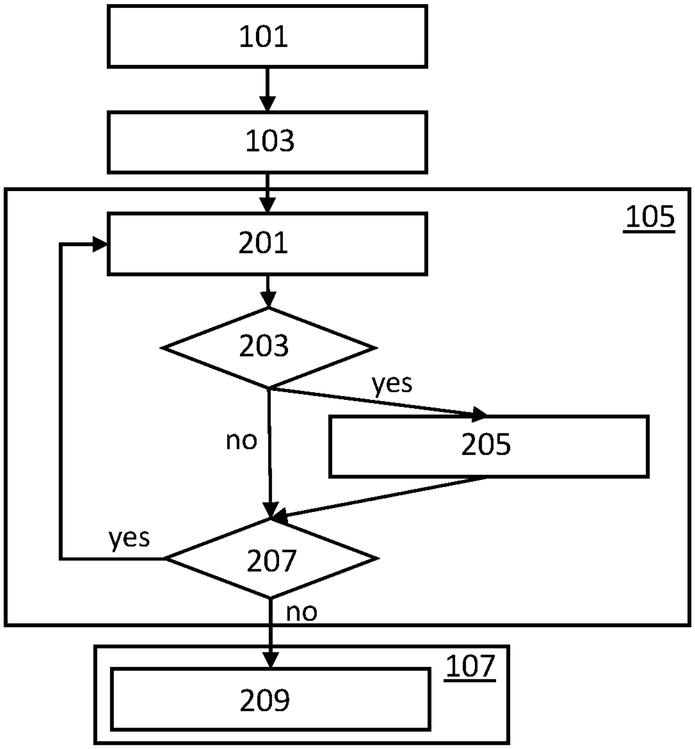
FIG. 9 is a flow diagram of a sixth embodiment of the method.

A sixth embodiment of the method of controlling one or more light sources to render light effects determined based on characteristics of audio content while the audio content is being rendered on an audio rendering device is shown in FIG. 9. The sixth embodiment of FIG. 9 is an extension of the first embodiment of FIG. 3. In the embodiment of FIG. 9, the one or more light sources comprises a plurality of light sources. Furthermore, step 105 of FIG. 3 is implemented by steps 201, 203, 205, and 207 and step 107 of FIG. 3 is implemented by a step 209.

In the first iteration of step 201, step 201 comprises determining a first light effects based on one or more characteristics of the audio content while applying smoothing according to the determined degree of smoothing, as determined in step 103. Step 103 comprises determining a color and an intensity of the light effect and optionally a fade-in duration and/or a fade-out duration.

Step 203 comprises determining whether the light effect determined in step 201 relates to a key event. A key event corresponds to a moment where being out of sync is the most noticeable. If the light effect determined in step 201 relates to a key event, step 205 is performed. If not, step 205 is skipped and step 207 is performed. Step 205 comprises increasing the intensity of the light effect determined in step 201. This ensures that although smoothing is increased, the key event will still ‘pop’ with respect to the rest of the audio content. Step 207 is performed after step 205.

Step 207 comprises determining whether all light effects have been determined, e.g., whether there are events for which no light effect has been determined yet. If so, then the next light effect is determined in the next iteration of step 201, and the method proceeds as shown in FIG. 9. If not, step 209 is performed next.

Step 209 comprises controlling the plurality of light sources to alternately render the light effects such that the light effects are distributed over the plurality of light sources. Thus, light events may be distributed over the lamps as well as being smoothed. For example, for a part of a song containing four events per second, the light events may be ‘split’ and rendered alternating between two connected lamps. Not only does this mask potential out-of-sync issues, but it also provides more room for smoothing.

The embodiments of FIGS. 3 to 6 and 8 to 9 differ from each other in multiple aspects, i.e., multiple steps have been added or replaced. In variations on these embodiments, only a subset of these steps is added or replaced and/or one or more steps is omitted. As a first example, step 125 may be omitted from the embodiment of FIG. 4. As a second example. Steps 121 and 123 of FIG. 4 may be added to the embodiments of FIGS. 3, 5, 6, 8, and 9. As a third example, step 209 may be omitted from FIG. 9 and/or added to one or more of the embodiments of FIGS. 3 to 6 and 8. One or more of the embodiments of FIGS. 3 to 6 and 8 to 9 may be combined.

Figure 10:
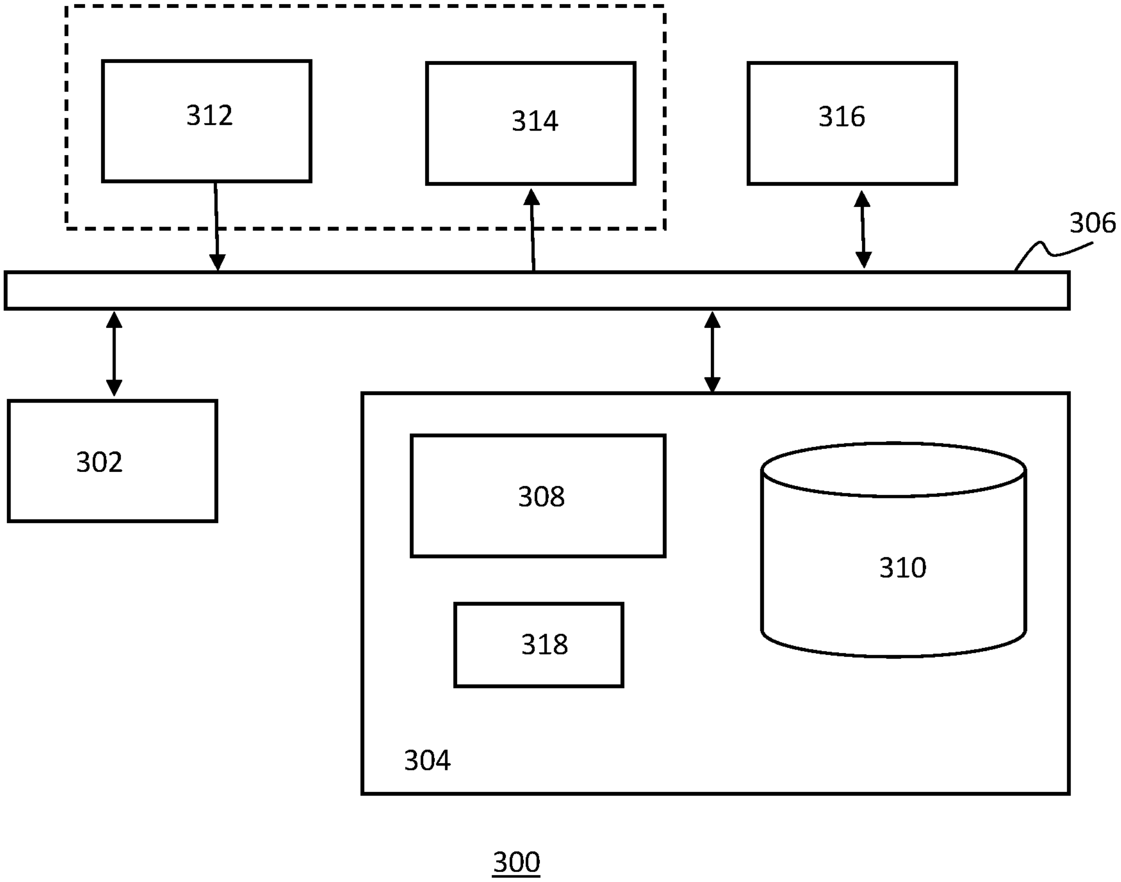
FIG. 10 is a block diagram of an exemplary data processing system for performing the method of the invention.

FIG. 10 depicts a block diagram illustrating an exemplary data processing system that may perform the method as described with reference to FIGS. 3 to 6 and 8 to 9.

As shown in FIG. 10, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification. The data processing system may be an Internet/cloud server, for example.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g., for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 10 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g., a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 10, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 10) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for controlling one or more light sources to render light effects determined based on characteristics of audio content while said audio content is being rendered on an audio rendering device, said system comprising:

at least one input interface;

at least one output interface; and at least one processor configured to:

determine, based on input received via said at least one input interface, whether a latency between said one or more light sources rendering said light effects and said audio rendering device rendering a corresponding portion of said audio content will likely exceed a threshold, determine a degree of smoothing based on whether said latency will likely exceed said threshold, said degree of smoothing being higher if said latency will likely exceed said threshold than if said latency will likely not exceed said threshold, determine said light effects based on said characteristics of said audio content while applying smoothing according to said determined degree of smoothing, and control, via said at least one output interface, said one or more light sources to render said light effects, wherein said at least one processor is configured to apply said smoothing according to said determined degree of smoothing by determining a fade-in duration and/or a fade-out duration for said light effects based on said determined degree of smoothing.

2. A system as claimed in claim 1, wherein said at least one processor is configured determine an estimate of said latency.

3. A system as claimed in claim 2, wherein said at least one processor is configured to determine said degree of smoothing according to a smoothing function which uses said estimate of said latency as input.

4. A system as claimed in claim 1, wherein said at least one processor is configured to determine said fade-in duration of a light effect further based on a distance between a color and/or intensity of said light effect and a color and/or intensity of the preceding light effect and/or determine said fade-out duration of a light effect based on a distance between said color and/or intensity of said light effect and a color and/or intensity of the succeeding light effect.

5. A system as claimed in claim 1, wherein said at least one processor is configured to:

determine, for a period of a plurality of consecutive periods of said audio content, a quantity of light effects to be rendered during said period, said consecutive periods having a predefined duration, and determine said degree of smoothing for said light effects to be rendered during said period based on whether said latency will likely exceed said threshold and further based on said quantity of light effects determined for said period.

6. A system as claimed in claim 5, wherein said at least one processor is configured to determine said light effects to be rendered during said period in dependence on a user-selected dynamicity level.

7. A system as claimed in claim 1, wherein said at least one processor is configured to determine whether said latency will likely exceed said threshold based on a type of said audio rendering device and/or a user specified latency and/or characteristics of an audio system, said audio system comprising said audio rendering device.

8. A system as claimed in claim 1, wherein said at least one processor is configured to determine said degree of smoothing further based on whether said latency will likely not exceed a maximum, said degree of smoothing being higher if said latency will likely exceed said threshold and will likely not exceed said maximum than if said latency will likely exceed said maximum.

9. A system as claimed in claim 1, wherein said at least one processor is configured to determine for at least one of said light effects whether said at least one light effect relates to a key event in said audio content and increase an intensity of said at least one light effect.

10. A system as claimed in claim 1, wherein said one or more light sources comprises a plurality of light sources and said at least one processor is configured to control said plurality of light sources to alternately render said light effects such that said light effects are distributed over said plurality of light sources.

11. A system as claimed in claim 1, wherein said at least one processor is configured to determine that said latency will likely exceed said threshold when a user specifies a latency larger than a further threshold.

12. A system as claimed in claim 1, wherein said at least one processor is configured to determine whether a user-specified latency value exceeds said threshold and determine said degree of smoothing further based on whether said user-specified latency value is larger than a further threshold.

13. A method of controlling one or more light sources to render light effects determined based on characteristics of audio content while said audio content is being rendered on an audio rendering device, said method comprising:

determining, based on received input, whether a latency between said one or more light sources rendering said light effects and said audio rendering device rendering a corresponding portion of said audio content will likely exceed a threshold;

determining a degree of smoothing based on whether said latency will likely exceed said threshold, said degree of smoothing being higher if said latency will likely exceed said threshold than if said latency will likely not exceed said threshold;

determining said light effects based on said characteristics of said audio content while applying smoothing according to said determined degree of smoothing; and controlling said one or more light sources to render said light effects, wherein said smoothing according to said determined degree of smoothing is applied by determining a fade-in duration and/or a fade-out duration for said light effects based on said determined degree of smoothing.

14. A computer program product for a computing device, the computer program product comprising computer program code to perform the method of claim 13 when the computer program product is run on a processing unit of the computing device.

* * * * *